J. A. ROBERTSON & W. A. RIDDELL.
PHOTOGRAPHIC CAMERA.
APPLICATION FILED NOV. 23, 1915.
1,195,400.
Patented Aug. 22, 1916.
2 SHEETS—SHEET 1.
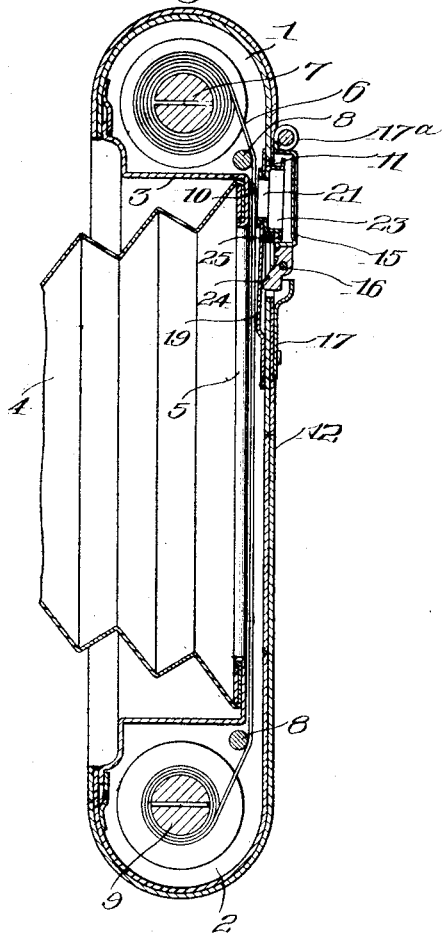
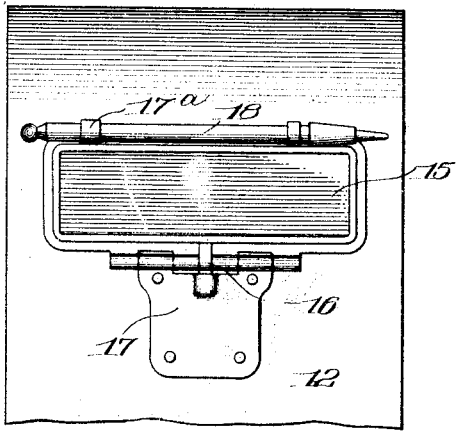
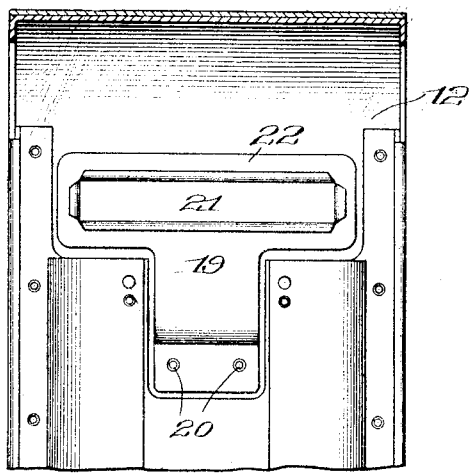
WITNESSES:
Nelson H. Capp
George L. Powell
INVENTORS
John A. Robertson
William A. Riddell
BY
their ATTORNEYS.

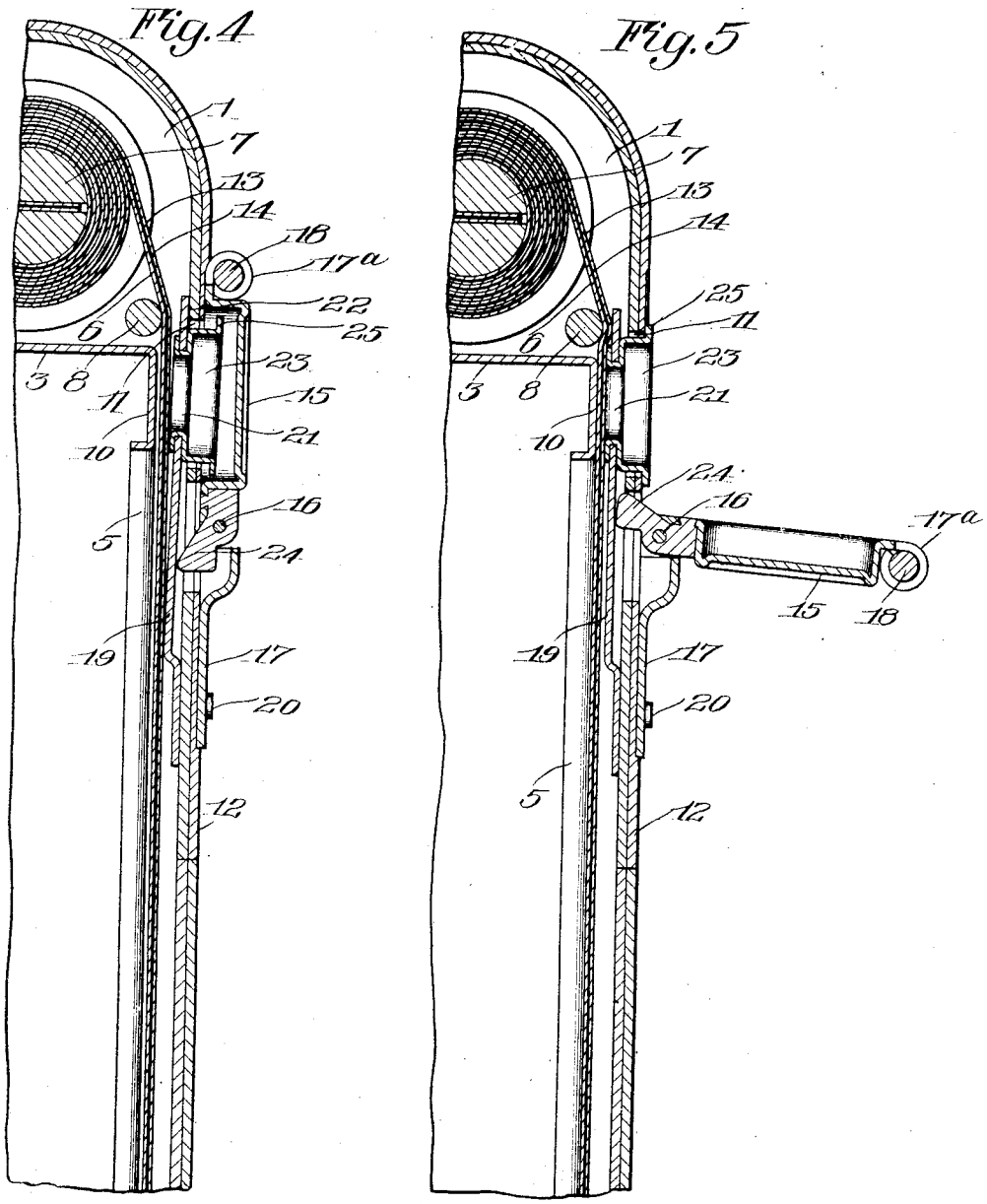

UNITED STATES PATENT OFFICE.

JOHN A. ROBERTSON AND WILLIAM A. RIDDELL, OF ROCHESTER, NEW YORK, ASSIGNORS TO EASTMAN KODAK COMPANY, OF ROCHESTER, NEW YORK, A CORPORATION OF NEW YORK.

PHOTOGRAPHIC CAMERA.

1,195,400.  Specification of Letters Patent.  Patented Aug. 22, 1916.

Application filed November 23, 1915. Serial No. 63,005.

*To all whom it may concern:*

Be it known that we, JOHN A. ROBERTSON and WILLIAM A. RIDDELL, of Rochester, in the county of Monroe and State of New York, have invented certain new and useful Improvements in Photographic Cameras; and we do hereby declare the following to be a full, clear, and exact description of the same, reference being had to the accompanying drawings, forming a part of this specification, and to the reference-numerals marked thereon.

Our present invention relates to photography and more particularly to photographic cameras or roll holders of the type in which a door is provided, usually at the back of the camera, for inscribing the film or other sensitive material while it is still in the camera and in connection with each exposure as it is made, the inscription being usually light printed to be photographically recorded on the negative.

The invention has for its object to provide a simple and efficient door of this nature that may be conveniently and quickly manipulated and which will be operatively connected in a simple manner with the clamping device for holding the sensitized material flat and excluding light during the marking operation to the advantage of both elements.

To these and other ends the invention resides in certain improvements and combinations of parts all as will be hereinafter more fully described, the novel features being pointed out in the claims at the end of the specification.

In the drawings: Figure 1 is a central vertical section through a familiar type of camera provided with a door constructed in accordance with and illustrating one embodiment of our invention; Fig. 2 is a fragmentary elevation of the camera back showing the door in closed position; Fig. 3 is a fragmentary view of the camera back partly in section, showing the film clamping device at the front thereof, and Figs. 4 and 5 are fragmentary enlarged sectional views corresponding to Fig. 1 and showing the door in its closed and open positions, respectively.

Similar reference numerals throughout the several figures indicate the same parts.

Cameras of the type referred to are now well known and their general operation may be but briefly described. In the present instance, we have shown a film camera having film chambers 1 and 2 on opposite sides of an inner frame 3 to which the bellows 4 is secured and the opening 5 at the rear of which constitutes the exposure opening. The film 6 is wound from a feed spool 7 over guide rolls 8 past the exposure opening 5 to a winding roll 9 in the chamber 2. The frame 3 is widened at 10 to form a table for supporting the film while it is being written upon and this table comes opposite to an opening 11 in the back 12 through which the writing implement is inserted. We have shown in this instance, one of several ways of recording the marks on the film and it consists in winding with the latter a strip of carbon paper 13 (Fig. 4) that lies between the film 6 and the outer protective covering or backing strip 14. The carbon paper and backing strip together are sufficiently opaque to protect the film from light but when the two together are written upon, the carbon paper is rendered translucent along the trace of the implement and the backing 14, not being alone sufficient to entirely exclude light, the marks are reproduced photographically upon the film beneath by the light that enters locally through the opening 11.

The opening 11 must be normally closed and in the practice of our present invention, we provide a door 15 pivoted at 16 on a pintle carried by a leaf 17 on the back 12. The door is preferably recessed as shown and may carry a clip 17ª for holding a stylus 18 with which the writing is done. On the inside of the back 12 a spring clamping plate 19 is secured at 20. The free end of it forms a frame, the opening 21 of which is opposite the table 10 and the opening 11 in the back. The normal position of the spring plate is that shown in Fig. 4 where the margin of the frame engages close against the inside of the back 12 around the opening 11 as at 22 and excludes light. The plate is then not in contact with the film or its coverings which can be fed without hindrance while a collar 23 on the plate surrounding the frame portion projects out through the opening 11 and into the cavity of the cover 15, as shown.

When the cover 15 is raised or opened to the position of Fig. 5 for writing purposes, a cam finger 24 thereon projecting to the opposite side of its pivot, slidably engages the plate 19 and forces it down to the position shown in Fig. 5 where it clamps the film and its covering against the table 10 and not only holds it flat for writing purposes, but excludes light from all portions except the area directly beneath the opening 21 therein. At the same time, lateral flanges 25 on the collar 23 are pressed firmly in a light-tight manner against the outside of the back 12 around the margin of the opening 11 and prevent light from entering at that point.

The cam finger 24 on the cover is offset in such a manner that as the cover is swung between open and closed positions, the finger passes across the pivotal center in continuous contact with the spring plate 19. The pressure of the latter therefore tends to hold the cover closed in Fig. 4 and open in Fig. 5 in a yielding manner and correspondingly in the position of Fig. 5, the cover holds the clamping plate in its operative position against the spring tension.

We claim as our invention:

1. The combination with a camera wall having an opening therein adapted to permit marking the sensitive material and a clamping member for the latter on the inner side of the wall adjacent to the opening, of a cover for said opening pivoted to the wall and operatively connected to the clamping member to move the latter to operative position when the cover is opened.

2. The combination with a camera wall having an opening therein adapted to permit marking the sensitive material and a clamping member for the latter on the inner side of the wall adjacent to the opening, of a cover for said opening pivoted to the wall and having a cam portion slidably engaging the clamping member to move the latter to operative position when the cover is opened.

3. The combination with a camera wall having an opening therein adapted to permit marking the sensitive material and a clamping member for the latter on the inner side of the wall adjacent to the opening, of a cover for said opening pivoted to the wall and retained in either open or closed position by the clamping member.

4. The combination with a camera wall having an opening therein adapted to permit marking the sensitive material and a cover for said opening pivoted to the wall, of a spring clamping member for the sensitive material on the inner side of the wall moved to operative position by opening the cover and acting upon the latter to maintain it in open and closed positions.

5. The combination with a camera wall having an opening therein adapted to permit marking the sensitive material and a spring clamping member for the latter on the inner side of the wall adjacent to the opening, of a cover for said opening pivoted to the wall and having a cam portion slidably engaging the spring clamping member to move it to operative position when the cover is opened, said cam portion being adapted to move across the center of movement of the cover and to hold the latter in either open or closed position through the pressure of the spring clamping member thereon.

JOHN A. ROBERTSON.
WILLIAM A. RIDDELL.

Witnesses:
RAYMOND O. WILSON,
EDITH WATERSTRAAT.

Copies of this patent may be obtained for five cents each, by addressing the "Commissioner of Patents, Washington, D. C."